United States Patent [19]

Frasure

[11] 3,799,436
[45] Mar. 26, 1974

[54] LOW SPEED LINEAR INDUCTION MOTOR REACTION RAIL

[75] Inventor: James W. Frasure, Houston, Tex.

[73] Assignee: The Dow Chemical Company, Midland, Mich.

[22] Filed: Mar. 9, 1972

[21] Appl. No.: 233,099

[52] U.S. Cl............ 238/122, 104/148 LM, 238/134, 238/150, 310/12
[51] Int. Cl............................................. E01b 25/00
[58] Field of Search ..... 104/148 LM; 238/150, 152, 238/122; 310/12, 13

[56] References Cited
UNITED STATES PATENTS

| | | | |
|---|---|---|---|
| 3,667,398 | 6/1972 | English | 104/148 LM |
| 3,516,361 | 6/1970 | Hart | 104/148 LM |
| 3,612,395 | 10/1971 | English | 104/148 LM |
| 3,602,786 | 8/1971 | Malo-Podvalnaya et al. | 310/13 |
| 3,385,228 | 5/1968 | Chung | 104/148 LM |

Primary Examiner—Gerald M. Forlenza
Assistant Examiner—Richard A. Bertsch
Attorney, Agent, or Firm—William M. Yates; Robert W. Selby; Lloyd S. Jowanovitz

[57] ABSTRACT

A linear electric induction motor reaction rail with a ferromagnetic rotor member and electrically and thermally conductive nonmagnetic head and support members attached to the rotor member at opposite ends thereof. The reaction rail is suitable for use in a monorail mass transit system.

14 Claims, 3 Drawing Figures

PATENTED MAR 26 1974 3,799,436

3,799,436

LOW SPEED LINEAR INDUCTION MOTOR REACTION RAIL

BACKGROUND OF THE INVENTION

This invention relates to a linear electric induction motor and more in particular relates to a composite reaction rail for use as a secondary with a movable stator of a linear electric induction motor.

A linear electric induction motor (LIM) is essentially a squirrel cage motor which has been split along the axis of its secondary, i.e. rotor, and then unrolled into a basically linear configuration. The operation of such a LIM is well known in the art. Since LIMs are relatively trouble free, quick responding and can attain high speeds, they have been employed for a number of different purposes including high speed railway transportation, molten metal pumps and shock absorbers to reduce the speed of metal being transported on a conveyor. One of the advantages of the LIM is that it can propel a body, such as a railway train, at a high rate of speed. However, as the body accelerates or decelerates there is a generation of heat which can exceed the melting point of the reaction rail employed, thereby causing reduced efficiency or complete failure of the rail.

It is an object of this invention to provide a reaction rail for use as a secondary in linear electric induction motors which can be employed at low speeds without deleteriously affecting the rail.

It is another object of this invention to provide a reaction rail for simultaneous use as a secondary with two movable linear electric induction motor stators, i.e. primaries.

Other objects and advantages of this invention will become apparent during the course of the following description.

SUMMARY OF THE INVENTION

A LIM reaction rail has been developed which accomplishes the above objects. The reaction rail basically comprises an electrically, thermally conductive, nonmagnetic support member suited to be physically attached to a base. A ferromagnetic rotor member is electrically and physically attached to the support member. An electrically and thermally conductive, nonmagnetic head member is electrically and physically attached to the rotor member at a position substantially opposite to the support member.

The support member is adapted to dissipate heat from the rotor member and to physically support the rotor member and the head member. When more than one rotor member is employed they are spaced apart by a nonmagnetic material to prevent magnetic flux flow therebetween. The rotor member is of a physical configuration complementary to a LIM stator and has an electrical resistivity sufficient to provide a desired torque when combined with the desired LIM stator. The head member is suitable to remove and dissipate heat from the rotor member.

The composite of the support member, rotor member and head member is an integral structure suitable for use as a stationary rotor or reaction rail in a LIM with a movable stator. The LIM reaction rail can be used at low speeds, such as generally encountered when starting or stopping a vehicle, without developing sufficient heat to detrimentally effect the usefulness of the reaction rail.

DESCRIPTION OF THE DRAWING

The accompanying drawing further illustrates the invention.

Identical numerals, distinguished by a letter suffix, within the several figures represent parts having a similar function within the different embodiments.

DESCRIPTION OF THE PREFERRED EMBODIMENTS

Figure 1:
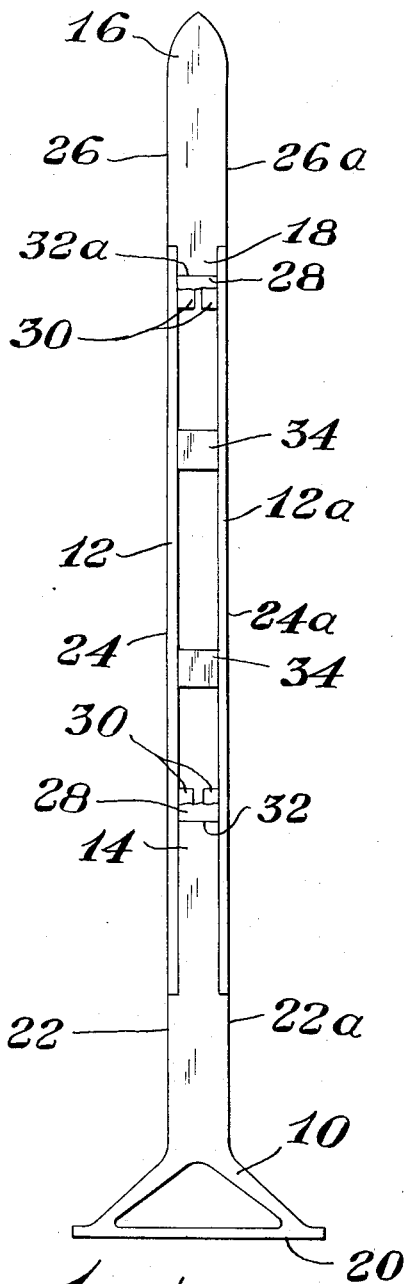
FIG. 1 is a transverse view of the LIM reaction rail.

In FIG. 1 there is depicted one embodiment of the invention which basically comprises a support member 10 physically and electrically attached to two ferromagnetic rotor members 12 and 12a at a reduced thickness section 14 of the support member 10. The rotor members 12 and 12a are electrically and mechanically attached to a head member 16 at a reduced thickness portion 18 of the head member 16. The composite of the support member 10, two rotor members 12 and 12a and head member 16 form an integral structure or reaction rail suitable for use as a stationary rotor in LIM with at least one and preferably two movable stators.

A supporting surface 20 is positioned at a second end of the support member 10 to provide a means of affixing the reaction rail to a base such as, for example, a concrete, metal or nonmetallic body. The supporting surface 20 is adapted to be permanently and preferably removably attached to the base by common means discussed in detail hereinafter. The supporting surface 20 is preferably planar in configuration, but can be of any desired configuration suitable to be physically and stably attached to the particular base; consequently, the supporting surface 20 can be, for example, a regular or irregular surface or, when a suitable attaching means is employed, one in which a single point contacts the base. The specific configuration of the supporting surface 20 is important only insofar as it provides the desired support for the reaction rail.

In the embodiment of FIG. 1 the support member 10, rotor member 12 and 12a and head member 16 have outer wall portions 22 and 22a, 24 and 24a, and 26 and 26a, respectively. The outer wall portion 24 is in a planar relationship with the adjacent or abutting outer wall portions 22 and 26 of the support member and the head member, respectively. Likewise, the outer wall portion 24a of the rotor member 12a is in a planar relationship with the adjacent or abutting outer wall portions 22a and 26a of the support member 10 and the head member 16, respectively.

The support member 10 is affixed to rotor members 12 and 12a by common means such as bolting, brazing, riveting, screwing and welding; however, welding is preferred since this technique provides the desired electrical contact and physical strength together with sufficient physical contact between the rotor members 12 and 12a and the support member 10 to provide a path for heat flow from the rotor members to the support member. The strength of the bond between the rotor members 12 and 12a and the support member 10 can be improved by the incorporation of a connecting means.

The connecting means is conveniently comprised of, for example, a nonmagnetic member 28 explosively bonded to a weldable element such as two spaced apart magnetic weld supports 30. Desirably the nonmagnetic member 28 is formed of a material readily welded to the abutting support member 10 or the abutting head member 16. The magnetic weld supports 30 are desirably formed of a material readily welded to the rotor members 12 and 12a. The described connecting means can be welded to the support member 10 and the head member 16 along surfaces 32 and 32a of the support member 10 and the head member 16, respectively.

The spaced apart rotor members 12 and 12a can readily be attached to the abutting magnetic weld supports 30 and 30a by, for example, resistance welding.

The substantially parallel rotor members 12 and 12a are positioned in a spaced apart relationship by a nonmagnetic element such as a spacer 34. Such spaced apart relationship permits the employment of two separate and distinct stators without providing a continuous path for the magnetic flux from the rotor member 12 to the rotor member 12a, that is, it is undesirable to short circuit the magnetic flux. The nonmagnetic element can for example be a vacuum, air, aluminum, copper, stainless steel, an epoxy-resin, and the like. In FIG. 1 the spacer 34 is a nonmagnetic metal element either permanently or removably attached to the rotor members 12 and 12a by for example, bolting, riveting, welding and the like. Preferably the rotor members 12 and 12a are of sufficient thickness and strength to remain in a desired position with respect to the base, such as vertical, without substantial movement. The spacers 34 can also be used to add additional support or rigidity to the reaction rail.

The head member 16 is a solid nonmagnetic metal with a thermal conductivity greater than that of the rotor members 12 and 12a. The primary function of the head member 16 is to dissipate heat generated in rotor members 12 and 12a during operation of the LIM. The lowest speed of a body, such as a train, traveling over the reaction rail is limited by the amount of heat generated within the rotor members 12 and 12a by the electromagnetic LIM. It is, therefore, preferred that both the support member 10 and head member 16 be of substantially the same highly thermal conductive material. This will assist in dissipating heat from the rotor members 12 and 12a and thereby lower the minimum possible operating speed of the train and also increase the time the train LIM can run at the minimum speed.

Figure 2:
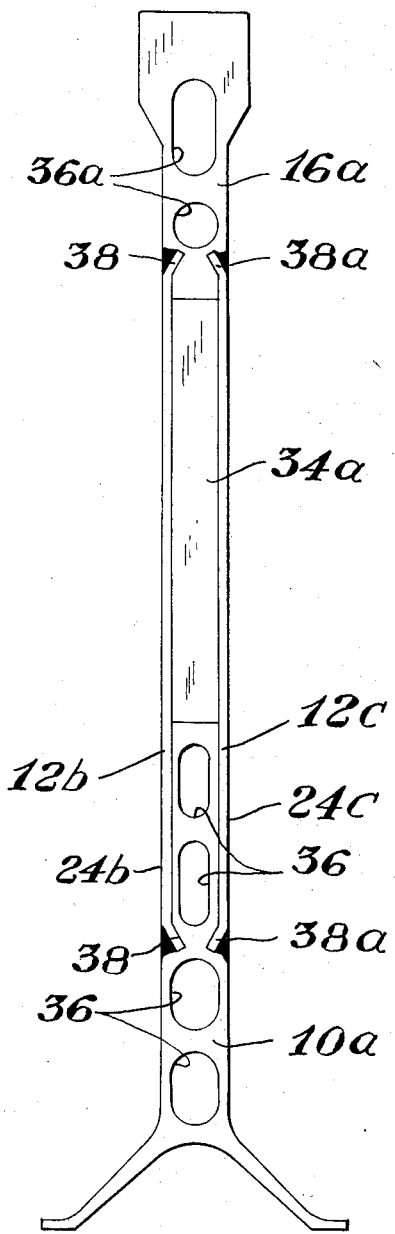
FIG. 2 is a transverse view of another embodiment of the LIM reaction rail.

The reaction rail illustrated in FIG. 2 is another embodiment of the invention. A support member 10a is an extruded aluminum member with inner wall portions 36 defining shaped holes extending longitudinally through the support member 10a, that is, the holes extend in the direction of extrusion. The holes defined by the wall portions 36 reduce the weight of the support member 10a without significantly altering the strength or heat dissipating characteristics of the support member.

The head member 16a has inner wall portions 36a defining shaped holes extending longitudinally through the head member 16a to reduce the weight and material used in the head member without significantly altering the strength or heat dissipating properties.

The rotor members 12b and 12c are in substantially parallel relationship to each other to conform with the configuration of a movable stator designed to pass in close proximity to the rotor members during operation. The rotor members 12b and 12c are spaced apart by a spacer 34a. The spacer 34a consists of, for example, an epoxy-resin capable of maintaining the desired characteristics at operating temperatures of up to about 300°F.

Joining portions 38 and 38a of the rotor members 12b 12c, respectively, are inwardly bent toward each other at an angle, such as about 45°, from the parallel outer wall portions 24b and 24c of the rotor members 12b and 12c, respectively. This configuration of the joining portions 38 and 38a provides a larger area for welding the support member 10a and the head member 16a to the rotor members 12b and 12c without significantly altering the strength or heat conductive properties of the support member or the head member.

It is preferable that the support member 10a and head member 16a be an aluminum alloy and more preferably an aluminum alloy designated as 6061 in American Society for Testing and Materials (ASTM) specification B221-69. The 6061-T6 temper is preferred. Such an aluminum alloy is suitable to dissipate heat from the rotor members 12b and 12c when such members are formed of a preferable ferromagnetic material such as a steel described in ASTM specification A37-5-64.

The ferromagnetic rotor members 12b and 12c have sufficient electrical resistance to develop adequate torque to start and stop the body, to which the movable stator is attached, within a desired distance. The electrical resistance of the ferromagnetic material used is less than that required to "open circuit" the LIM and thereby prevent development of the desired torque. The specific material for the support member, head member, and rotor members is selected to provide the desired corrosion resistance to the atmosphere, strength characteristics at temperatures up to about 300°F., electrical resistance, and thermal conductivity at the operating temperatures.

Figure 3:
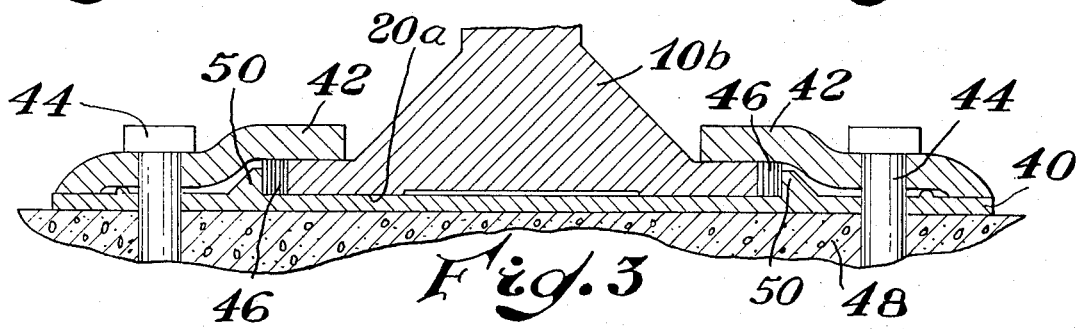
FIG. 3 is a cross-sectional view of a means for clamping the LIM reaction rail to a base.

During operation of the reaction rail in, for example, a mass transit system it is necessary that the reaction rail be connected or anchored to a base to prevent movement of the rail. This can be accomplished by a number of means known to those skilled in the art, but it is preferred that an anchoring device as depicted in FIG. 3 be employed. The anchoring device combines a tie plate 40, tie clips 42, tie bolts 44, optional horizontal aligning shims 46 and optional vertical aligning shims (not shown). Such an anchoring device in combination with the described reaction rail avoids contact between the support member 10b and a base 48 and thereby assists in minimizing the corrosion and errosion of the support member and the base. The base 48 is, for example, concrete, wood, compacted earth and the like.

The tie plate 40 is, for example, a rectangularly shaped plate with two substantially parallel spaced apart flanges or shoulders 50. The shoulders 50 at least partially and preferably entirely extend across the width of the tie plate 40 in a direction substantially parallel to the primary or longitudinal direction of the support member 10b. The shoulders 50 are spaced apart by a distance at least equal to the widest section of the support member 10b at the point of contact with the tie plate 40. The tie clips 42 are of a suitable configuration to maintain the supporting surface 20a of the support member 10b in substantially stationary contact with the abutting surface of the tie plate 40 when the tie bolts 44 are tightened against the tie clips 42.

To align the reaction rail in the desired position, a sufficient thickness of the aligning shims 46 are positioned between the shoulders 50 and the support member 10b and also between the supporting surface 20a and the abutting surface of the tie plate 40 to obtain the desired alignment. Vertical alignment of the reaction rail is carried out by suitable placement of the vertical aligning shims (not shown).

During operation of the LIM system, the stator is physically free of contact with the reaction rail. Stopping of the body attached to the stator can be accomplished by dynamic braking, such as by reversing the current flow to the stator. It is also within the scope of this invention to employ a separate or conventional braking system. This is readily carried out when the transported body is supported by conventional wheels in contact with, for example, the base or support rails separate and distinct from the reaction rail. It is preferred that the transported body be supported by a pressurized gas, such as air, being maintained between the transported body and the vertical surface of the reaction rail and also between the transported body and the horizontal surface of the base. Such an air cushion negates the need for an auxiliary support means for the transported body.

When an air cushion is employed in a desired mass transit system it is preferred that the reaction rail be suitably aligned so as to not deviate greater than about ± 1° from vertical at any point along the outer wall portions of the support member, rotor member or head member. It is also desirable that such outer wall portions be maintained substantially longitudinally straight, i.e. up to about ± 0.5 inches deviation, in about 50 feet of reaction rail length. Individual sections of reaction rail can be joined into a single length by means known to those skilled in the art.

As is apparent from the foregoing specification the device of the present invention is susceptible of being embodied with various alterations and modifications, which may differ from those described in the preceding description. For this reason, it is to be fully understood that all of the foregoing is intended to be illustrative and not to be construed or interpreted as being restrictive or otherwise limiting the present invention.

What is claimed is:

1. A linear electric induction motor reaction rail comprising an electrically and thermally conductive nonmagnetic support member suited to dissipate heat from a ferromagnetic rotor member and to be physically attached to a base to support said rotor member and a head member; a ferromagnetic rotor member electrically and physically attached to said support member, said rotor member of a physical configuration complementary to a linear induction motor stator and of an electrical resistivity sufficient to provide a desired torque when combined with the desired linear induction motor stator; an electrically and thermally conductive nonmagnetic head member electrically and physically attached to said rotor member at a position substantially opposite to the support member, said head member suited to dissipate heat from said rotor member; said support member and said head member being of a nonmagnetic metal having a thermal conductivity greater than that of said rotor member; the composite of said support member, said rotor member and said head member forming an integral structure suitable for use as a stationary rotor in a linear electric induction motor with a movable stator.

2. The reaction rail of claim 1 including two rotor members spaced apart by a nonmagnetic element.

3. The reaction rail of claim 2 wherein said rotor member is a steel.

4. The reaction rail of claim 2 wherein the individual components of the composite are permanently physically attached.

5. The reaction rail of claim 1 wherein the composite of said support member, said rotor member and said head member is an upstanding composite extending away from the base.

6. The reaction rail of claim 1 wherein outer wall portions of the composite of said support member, said rotor member and said head member are vertically aligned.

7. A linear electric induction motor reaction rail comprising an electrically and thermally conductive nonmagnetic support member suited to dissipate heat from a ferromagnetic rotor member and to be physically attached to a base to support said rotor member and a head member; two substantially parallel ferromagnetic rotor members electrically and physically attached to said support member and spaced apart by a nonmagnetic element, said rotor members of a physical configuration complementary to a linear induction motor stator and of an electrical resistivity sufficient to provide a desired torque when combined with the desired linear induction motor stator; an electrically and thermally conductive nonmagnetic head member electrically and physically attached to said rotor members at a position substantially opposite to the support member, said head member suited to dissipate heat from said rotor members; the composite of said support member, said head member and said rotor members having at least two substantially parallel outer wall portions, the outer wall portions of said rotor members being in planar relationship with the adjacent outer wall portion of said support and head members, the composite being an integral structure suitable for use as a stationary rotor in a linear electric induction motor with a movable stator.

8. The reaction rail of claim 7 wherein said support member includes a supporting surface substantially perpendicular to the parallel wall portions.

9. The reaction rail of claim 7 wherein said support member and said head member are of a nonmagnetic metal having a thermal conductivity greater than that of said rotor members.

10. A reaction rail for use in a mass transportation system wherein the reaction rail acts as a rotor to complete the magnetic circuits of two separate electric induction motors, the reaction rail comprising an electrically and thermally conductive nonmagnetic aluminum alloy support member suited to dissipate heat from two ferromagnetic rotor members and to be attached to a substantially horizontal base to support said ferromagnetic rotor members and a head member; two ferromagnetic steel rotor members welded to said support member, said rotor members of a physical configuration complementary to a linear induction motor stator and of an electrical resistivity sufficient to provide a desired torque when combined with the desired linear induction motor stator, and said rotor members spaced apart by a nonmagnetic spacer physically attached to the rotor members to thereby inhibit magnetic flux flow between said rotor members during electric current flow through the stator; an electrically and thermally conductive nonmagnetic aluminum alloy heat dissipating head member welded to said rotor members at a position substantially opposite to the support member, said head member suited to dissipate heat from the rotor members; the composite of said support member, said rotor members and said head member forming an integral structure with substantially planar outer wall portions suitable for use as a stationary rotor in a linear electric induction motor with a movable stator.

11. The reaction rail of claim 10 wherein the composite is an integral structure with at least two substantially parallel, substantially vertical outer wall portions and a supporting surface substantially perpendicular to the vertical parallel wall portions.

12. A linear electric induction motor reaction rail comprising an electrically and thermally conductive nonmagnetic, aluminum alloy support member suited to dissipate heat from a ferromagnetic rotor member and to be physically attached to a base to support said rotor member and a head member; two ferromagnetic rotor members spaced apart by a nonmagnetic element electrically and physically attached to said support member, said rotor members of a physical configuration complementary to a linear induction motor stator and of an electrical resistivity sufficient to provide a desired torque when combined with the desired linear induction motor stator; an electrically and thermally conductive nonmagnetic, aluminum alloy head member electrically and physically attached to said rotor members at a position substantially opposite to the support member, said head member suited to dissipate heat from said rotor members; the composite of said support member, said rotor members and said head member forming an integral structure suitable for use as a stationary rotor in a linear electric induction motor with a movable stator.

13. The reaction rail of claim 12 wherein the composite of said support member, said rotor members and said head member is an upstanding composite extending away from the base.

14. The reaction rail of claim 12 wherein outer wall portions of the composite of said support member, said rotor members and said head member are vertically aligned.

* * * * *